US012562572B2

(12) United States Patent
Ozlemis et al.

(10) Patent No.: US 12,562,572 B2
(45) Date of Patent: *Feb. 24, 2026

(54) METHOD AND SYSTEM FOR UNSUPERVISED IDENTIFICATION OF BEHIND-THE-METER BATTERY ENERGY STORAGE SYSTEMS

(71) Applicant: Siemens Aktiengesellschaft, Munich (DE)

(72) Inventors: Hakan Ozlemis, Munich (DE); Ulrich Muenz, Princeton, NJ (US); Siddharth Bhela, Kendall Park, NJ (US)

(73) Assignee: Siemens Aktiengesellschaft, Munich (DE)

( * ) Notice: Subject to any disclaimer, the term of this patent is extended or adjusted under 35 U.S.C. 154(b) by 363 days.

This patent is subject to a terminal disclaimer.

(21) Appl. No.: 18/159,850

(22) Filed: Jan. 26, 2023

(65) Prior Publication Data

US 2024/0258796 A1 Aug. 1, 2024

(51) Int. Cl.
H02J 3/32 (2006.01)
G05B 19/042 (2006.01)
(Continued)

(52) U.S. Cl.
CPC .............. H02J 3/32 (2013.01); G05B 19/042 (2013.01); H02J 3/381 (2013.01);
(Continued)

(58) Field of Classification Search
CPC .......... H02J 3/32; H02J 3/381; H02J 7/00032; H02J 2300/22; G05B 19/042; G05B 2219/2639
(Continued)

(56) References Cited

U.S. PATENT DOCUMENTS

2015/0142347 A1* 5/2015 Mohan .................... H02S 50/00
702/60
2019/0369166 A1* 12/2019 Moslemi ................. H02J 3/144
(Continued)

OTHER PUBLICATIONS

Cheung, C. M., Kuppannagari, S. R., Kannan, R., & Prasanna, V. K. (Apr. 2020). Disaggregation of behind-the-meter solar generation in presence of energy storage resources. In 2020 IEEE Conference on Technologies for Sustainability (SusTech) (pp. 1-7). IEEE.
(Continued)

*Primary Examiner* — Md Azad

(57) ABSTRACT

A computer-implemented method for identifying behind-the-meter battery energy storage systems (BESS) in a distribution system includes measuring net power over a number of days via a meters at different locations in the distribution system. Using a time series of the measurement, a behind-the-meter BESS is detected by detecting flat intervals where the measured net power is substantially constant for a minimum continuous period, indicating BESS charge/discharge activity. If a BESS is detected, the time series data is used to detect first, second and third states that respective define net consumption, net generation and flat intervals indicating BESS charge/discharge activity. One or more eligible days are then determined that include a state change from the third state to the first state and a state change from the third state to the second. Intervals of BESS charge/discharge activity in the eligible days are extracted to evaluate a size of the detected BESS.

12 Claims, 6 Drawing Sheets

(51) Int. Cl.
| | |
| --- | --- |
| *H02J 3/38* | (2006.01) |
| *H02J 7/00* | (2006.01) |

(52) U.S. Cl.
CPC .. *H02J 7/00032* (2020.01); *G05B 2219/2639*
(2013.01); *H02J 2300/22* (2020.01)

(58) Field of Classification Search
USPC ........................................................ 700/287
See application file for complete search history.

(56) References Cited

U.S. PATENT DOCUMENTS

| | | | | |
| --- | --- | --- | --- | --- |
| 2020/0059098 | A1* | 2/2020 | Dong ..................... | G06Q 50/06 |
| 2020/0076196 | A1* | 3/2020 | Lee .......................... | H02J 3/008 |
| 2020/0259358 | A1* | 8/2020 | Hansen ..................... | H02J 7/35 |
| 2021/0083505 | A1* | 3/2021 | Beaston .................. | H02J 3/381 |
| 2021/0226466 | A1* | 7/2021 | Hansen ..................... | H02J 3/32 |
| 2022/0109298 | A1* | 4/2022 | Wang ..................... | H02J 3/004 |
| 2024/0055863 | A1* | 2/2024 | Guerrero Hernández ................... | |
| | | | | H02J 3/46 |
| 2025/0054082 | A1* | 2/2025 | Allen, Jr. ........... | G06Q 30/0283 |

OTHER PUBLICATIONS

Wang, F., Ge, X., Dong, Z., Yan, J., Li, K., Xu, F., . . . & Tao, P.
(2022). Joint energy disaggregation of behind-the-meter PV and
battery storage: A contextually supervised source separation approach.
IEEE Transactions on Industry Applications, 58(2), 1490-1501.
Chen, X., & Ardakanian, O. (2022). Data efficient energy disaggre-
gation with behind-the-meter energy resources. Sustainable Energy,
Grids and Networks, 32, 100813.

\* cited by examiner

Processor(s)  610

Machine-Readable Medium  620

BESS Location Detection Instructions  622

BESS Sessions Detection Instructions  624

BESS Size Evauation Instructions  626

Computing System 600

METHOD AND SYSTEM FOR UNSUPERVISED IDENTIFICATION OF BEHIND-THE-METER BATTERY ENERGY STORAGE SYSTEMS

TECHNICAL FIELD

The present disclosure relates to identification of behind-the-meter battery energy storage systems in power distribution systems, including detection of location, charge/discharge sessions and size of behind-the-meter battery energy storage systems connected to a grid.

BACKGROUND

Distributed energy resources are commonly installed with battery energy storage systems (BESS) for the purpose of storing excess energy generated for use when extra energy is needed. Especially, with the increase in distributed solar generators such as rooftop photovoltaics (PVs), and desire for self-sufficient energy systems, the installation of BESS has recently become popular in distribution grids. For example, voltage violations and power quality issues arising with high penetration of distributed solar generators can be mitigated by the grid-oriented operation of BESS. To realize the spread of BESS installations and grid-oriented operation of BESS, incentives and end-customer participation programs may be needed to make grid-supportive BESS more favorable. Thus, distribution system operators (DSOs) often need to identify regions or even end-customers according to their BESS potential. This exposes the necessity to find out where the installed BESS are located, and which customers have high or low BESS capacity.

Currently, most rooftop PVs and BESS are installed behind-the-meter, where only a customer's net power is measurable by a smart meter. Thus, there exists a challenge to determine the location, capacity, etc. of BESS in distribution grids using only the available smart meter net power measurements, which do not separately register the components of the measured net power, namely consumption, PV generation and BESS charge/discharge power.

Known approaches to solve the above-problem have mainly focused on the disaggregation of behind-the-meter PV generation rather than a standalone detection of the existence and size of BESS. The limited work in this subject has investigated the disaggregation of BESS jointly with the disaggregation of PV generation, which requires learning more parameters and the assumption of having reference PV generation and/or consumption measurements.

SUMMARY

Briefly, aspects of the present disclosure provide a method and a system for detection of location, charge/discharge sessions and size of behind-the-meter battery energy storage systems in a power distribution system, in an unsupervised and data efficient process using only net power measurements, without requiring prior separate measurements of local generation and consumption.

A first aspect of the disclosure provides a computer-implemented method for identifying behind-the-meter battery energy storage systems in a distribution system comprising distributed generators installed at a number of locations in the distribution system. The method comprises obtaining time series data of measured net power over a number of days via a respective meter at each location, and for each meter, processing the time series data to detect a behind-the-meter battery energy storage system (BESS) at the corresponding location based on detection of flat intervals in which the measured net power is constant within a defined tolerance band for a minimum continuous period, the flat intervals indicative of BESS charge/discharge activity. If a BESS is detected, the method comprises using the time series data of the measured net power to detect a first state defined by intervals of net power consumption from a grid, a second state defined by intervals of net power fed into the grid, and a third state defined by flat intervals corresponding to BESS charge/discharge activity, and therefrom determining one or more eligible days that include a state change from the third state to the first state and a state change from the third state to the second. The method further comprises extracting intervals of BESS charge/discharge activity in the one or more eligible days to evaluate a size of the detected BESS.

Further aspects of the disclosure are directed to computing systems and computer program products including instructions executable by a processor to carry out the above-described method and its optional embodiments.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
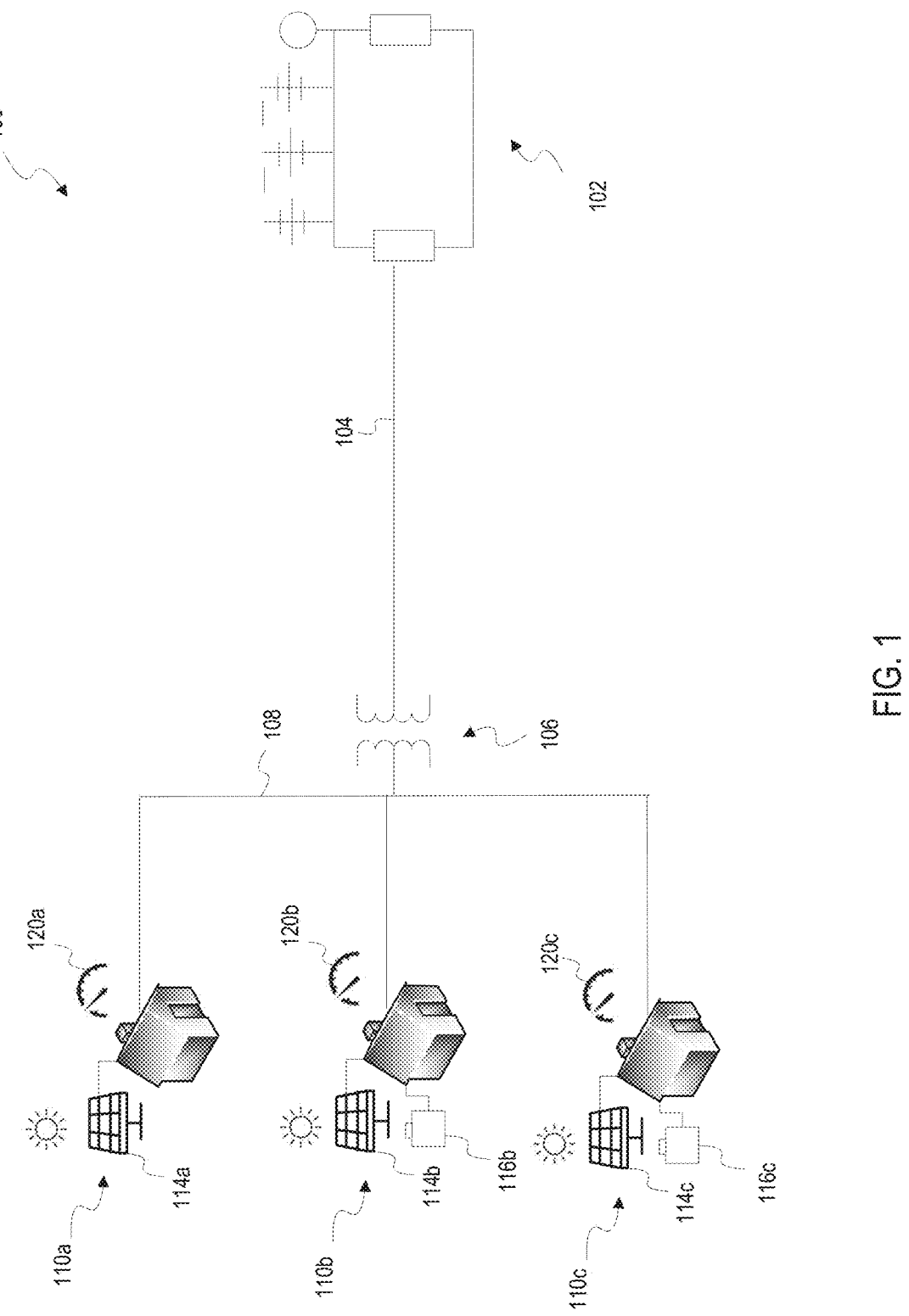
FIG. 1 illustrates an example of a power distribution system having distributed generators, wherein aspects of the present disclosure can be used for identifying behind-the-meter battery energy storage systems (BESS) at one or more locations in the power distribution system.

A non-limiting example of a distribution system where the disclosed methodology can be implemented is shown in FIG. 1. In the shown example, the distribution system 100 has a radial tree topology. As shown, the distribution system 100 may include a distribution substation 102 that may receive power from a transmission network via a step-down transformer (not shown). The stepped-down voltage from the distribution substation 102 may be carried by one or more feeders 104 to a respective distribution transformer 106, one of which is shown in FIG. 1. The distribution transformer 106 typically provides the final voltage transformation in the distribution system 100, stepping down the voltage used in the feeder 104 to the level used by end consumers. Output from the distribution transformer 106 may be carried by a distributor conductor 108, from which, tappings may be taken for power supply to end consumers at a number of consumption locations 110*a*, 110*b*, 110*c*, etc., which may include residential, commercial or industrial sites or buildings, among others.

The distribution system 100 may include a number of distributed generators, such a solar generators or photovoltaic (PV) systems, wind turbines, biomass generators, battery energy storage systems (BESS), among others, installed at different consumption locations. In the example shown in FIG. 1, some of the consumption locations 110*a*, 110*b*, 110*c* have installed thereon small-scale PV systems 114*a*, 114*b*, 114*c* (e.g., rooftop PVs). Continuing with the shown example, one or more of the consumption locations 110*b*, 110*c* may further include a BESS 116*b*, 116*c* coupled to the PV system 114*b*, 114*c*. In some examples, the distribution system 100 may also include one or more large-scale distributed generators (e.g., solar parks, wind parks, etc.), which may, for example, be coupled to one of the feeders 104.

It is of interest for a DSO, such as a utility company, to identify where BESS are located along with their size. This knowledge can be used, for example, to design better incentives and end-customer participation programs to install grid-supportive BESS, as well as for controlling grid-oriented operation of batteries, for example, to prevent voltage overload problems. In the shown example, a DSO may have access to historical and/or real-time measurements of power via meters (e.g., smart meters) 120*a*, 120*b*, 120*c*, etc. at different consumption locations 110*a*, 110*b*, 110*c* etc. However, it is typical for the PV systems 114*a*, 114*b*, 114*c*, etc. and the BESS 116*b*, 116*c*, etc. to be installed behind-the-meter, where only a customer's net power is measurable by the respective meter 120*a*, 120*b*, 120*c*, etc. Customers usually install PV systems and BESS without installing additional meters to record the activities of these devices separately.

The disclosed methodology is directed to the problem of determining the location, charge/discharge sessions and size of the behind-the-meter BESS 116*b*, 116*c*, etc. in the distribution system 100 using the available net power measurements $P_{net}$ by the smart meters 120*a*, 120*b*, 120*c*, etc., which do not separately measure the components of the measured net power $P_{net}$, namely consumption $P_c$, local generation $P_{PV}$ (in this case, solar generation) and BESS charge/discharge power $P_{BESS}$, as given by the relationship in equation (1), where t denotes time.

$$P_{net}(t) = P_c(t) - P_{PV}(t) \pm P_{BESS}(t) \qquad (1)$$

The present disclosure proposes an unsupervised methodology than can be used to identify behind-the-meter battery energy storage systems in a power distribution system having distributed generators installed at a number of locations, using only net metered power measurements. A "distributed generator" may include a device or system capable of feeding power into the grid, for example including a solar generator (PV), wind turbine, biomass generator, BESS, etc., or combinations thereof. The term "location", unless otherwise specified, refers to location of a load or power consumption, such as residential, commercial or industrial sites or buildings.

The disclosed methodology uses net power measurements obtained via meters at different locations to detect the existence of a behind-the-meter BESS at a location by detecting flat intervals in the net power measurement time series. The methodology has been developed around the recognition that a self-consumption-oriented operation is widely deployed in BESS, wherein the net power exchange with the grid becomes significantly small when the BESS is deployed (i.e., during charging or discharging activity), since the BESS is charged or discharged at a rate that closely matches the difference between local generation and consumption, until its capacity limits in this operation mode. The so-called "flat intervals" are defined to reflect this phenomenon, where the measured net power is essentially constant (zero or non-zero) within a defined tolerance band for a minimum continuous period. In order to evaluate the BESS size, the methodology further detects charge/discharge sessions of a detected BESS by determining eligible days when the BESS is fully utilized, i.e., days when the BESS starts empty (i.e., in a completely discharged state) and gets fully charged during the day. A size of the detected BESS is then evaluated by extracting intervals of charge/discharge activity in the eligible days. The "size" of a BESS may be defined in terms of its energy capacity and/or rated power.

Embodiments of the disclosed methodology are described hereinbelow referring to FIG. 2. The various modules described herein, including the BESS location detection module 202, the BESS sessions detection module 204 and the BESS size evaluation module 206, including components thereof, may be implemented in a computing environment in various ways, for example, as hardware and programming. The programming for the modules 202, 204, 206 may take the form of processor-executable instructions stored on non-transitory machine-readable storage mediums and the hardware for the modules may include processors to execute those instructions. The processing capability of the systems, devices, and modules described herein, including the BESS location detection module 202, the BESS sessions detection module 204 and the BESS size evaluation module 206, may be distributed among multiple system components, such as among multiple processors and memories, optionally including multiple distributed processing systems or cloud/network elements.

Figure 2:
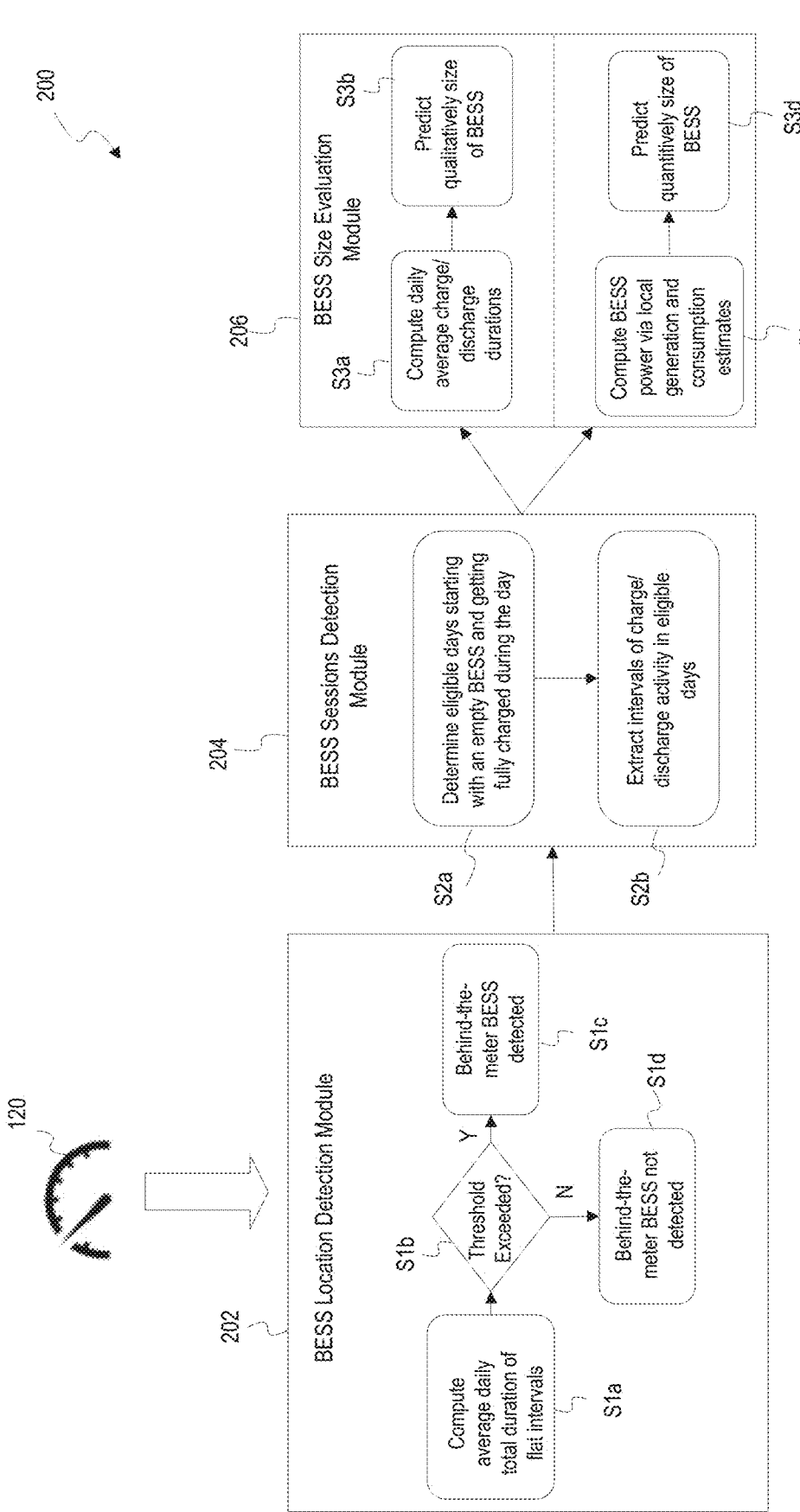
FIG. 2 is a schematic diagram illustrating an embodiment of the disclosed methodology for identification of behind-the-meter BESS, including detection of location, charge/discharge sessions and size of behind-the-meter BESS connected to a grid.

Referring to FIG. 2, the BESS location detection module 202 is configured to detect locations of behind-the-meter battery energy storage systems in a distribution system by detecting the presence of a BESS at a given location using measured net power via a respective meter 120 at that location. The measured net power includes time series data obtained over a number of days.

Figure 3:
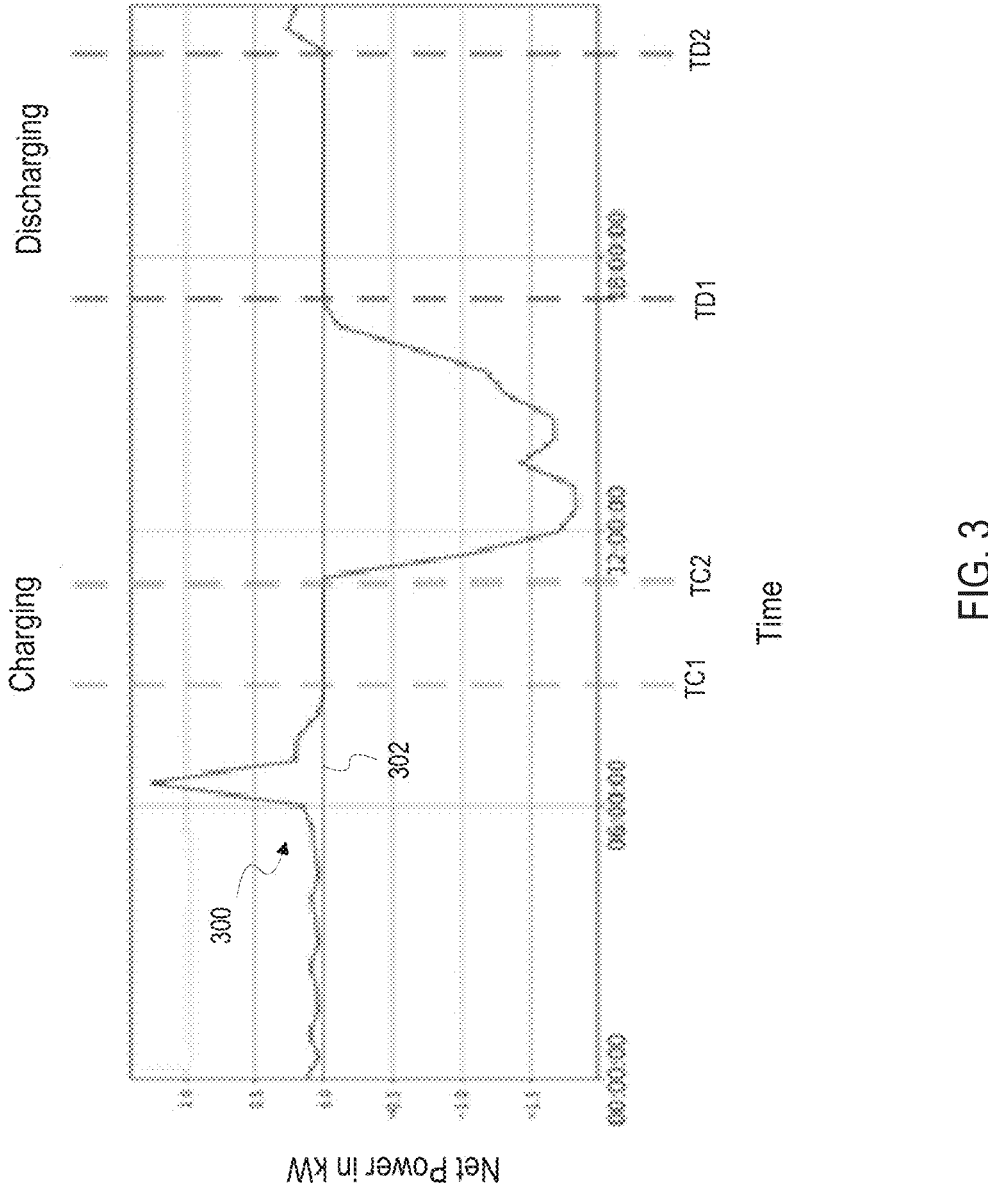
FIG. 3 is a graphical illustration of a time series of net power measured by a meter over a day, showing flat intervals indicating BESS charge/discharge activity.

For illustration, FIG. 3 shows an example of a time series of net power measured by a meter at a location (e.g., a residential site) having a behind-the-meter solar battery installation (i.e., a combination of PV and BESS) over a period of one day. The measured net power is graphically represented by a curve 300, where, as a matter of convention, a positive value (above the line 302) generally denotes net power consumption from the grid and a negative value (below the line 302) generally denotes net power fed into the grid. In the shown example, starting from the left, the measured net power 300 has a low positive value in the early hours due to a low load at nighttime. Around sunrise, the power consumption starts to increase due to increase in human activity, which increases the net power 300. The net power 300 peaks during the day and subsequently begins drop off due to increase in PV generation. When the PV generation exceeds the consumption, the self-consumption-oriented operation kicks the BESS into charging mode (at time TC1) to offset the energy imbalance. This results in a flat interval of the net power 300 during the charging activity. In the shown example, the flat interval is essentially an interval with very low or zero net power. This flat interval continues till the BESS is fully charged (at time TC2), after which the net power 300 becomes negative indicating that power is fed into the grid. With passage of time, the PV generation begins to decrease close to sunset and finally stops, whereby the power fed into the grid also decreases. When the consumption exceeds the PV generation, the BESS is kicked into discharging mode (at time TD1) to offset the energy imbalance, consistent with the self-consumption-oriented operation. This results in a flat or interval of the net power 300 during the discharging activity until the BESS is completely discharged (at time TD2).

Based on the above-illustrated trend of the measured net power with self-consumption-oriented operation of BESS, the presence of a behind-the-meter BESS at a location may be detected by detecting the existence of flat intervals upon processing the time series of the respective metering data. The underlying assumption is that the flat intervals are indicative of BESS charge/discharge activity and would not exist in the absence of a BESS. Since a BESS can take time to react to changes in consumption/generation, it may be suitable to use low resolution time series data (e.g., averaged every 10-15 mins). In some embodiments where the available metering data is high-resolution (e.g., 1 second), the processing of the time series data may include a pre-processing step to reduce the resolution as suitable for the present application.

A flat interval may be defined as an interval where the measured net power is constant within a defined tolerance band for a minimum continuous period. The tolerance band may be suitably determined to account for measurement error. In the disclosed embodiments, the flat intervals are "zero intervals" in which the measured net power is zero within a tolerance band which can be a defined as a specified percentage or fraction of the maximum measured net power in the time series data (e.g., 1% of the maximum measured net power). In alternate embodiments, the flat intervals can include non-zero constant value intervals. The minimum continuous period may specify a minimum number of consecutive time steps, the duration of which may be suitably defined to eliminate noise due to instantaneous power fluctuations (e.g., 30 minutes).

Continuing with reference to FIG. 2, according to an example embodiment, the BESS location detection module 202 may perform the following steps to detect the presence of a behind-the-meter BESS at a location using net power measured by a meter 120 at that location. Step S1a involves computing an average daily total duration of flat intervals. The BESS location detection module 202 may detect flat intervals (in this case, zero intervals), for example, by monitoring how long the measured net power has zero or significantly small values (e.g., 1% of the maximum measured net power) for a minimum number of consecutive time steps (e.g., at least 30 mins), compute a daily total duration of the flat intervals for each day, and average it over the number of days for which metering data is collected. Averaging the daily total duration of flat intervals over multiple days may be done to minimize measurement errors of single days. In an alternate embodiment, the averaging step may be obviated and a daily total duration of the flat intervals for a single day may be computed at step S1a.

Next, at step S1b, it is determined if the average daily total duration of the flat intervals over the number of days, or the daily total duration of the flat intervals for a single day, as computed at step S1a, is above a threshold (e.g., 2 hours). If yes, the BESS location detection module 202 determines that a behind-the-meter BESS is detected at the location of the meter 120 (step S1c). If not, the BESS location detection module 202 determines that no behind-the-meter BESS is detected at the location of the meter 120 (step S1d).

The BESS sessions detection module 204 is executed if a BESS is detected at the location of the meter 120. The BESS sessions detection module 204 is configured to detect charge/discharge sessions of the detected BESS in one or more eligible days when the BESS is fully utilized. As shown in FIG. 2, at step S2a, the eligible days are determined as days when the BESS starts empty (i.e., in a completely discharged state) and gets fully charged during the day. Considering only such eligible days, out of the total number of days for which metering data is collected, can enable an accurate estimation of the full capacity of the detected BESS. Next, at step S2b, intervals of BESS charge/discharge activity in the determined eligible day(s) are extracted for evaluating a size of the BESS. These steps are described in detail below.

To implement step S2a, the BESS sessions detection module 204 first uses the time series of the net power measured by the meter 120 to detect different states, namely, a first state defined by intervals of net power consumption from the grid, a second state defined by intervals of net power fed into the grid, and a third state defined by flat intervals corresponding to BESS charge/discharge activity. Consistent with the disclosed embodiment, the states may be determined based on a sign of the measured net power, where the first state may be defined by positive intervals, the second state may be defined by negative intervals, and the third state may be defined by zero intervals. Having established the intervals of the different states, the eligible days can be determined as days that include a state change from the third (zero) state to the first (positive) state, as well as a state change from the third (zero) state to the second (negative) state, in the same day. This may be understood referring to the state diagram illustrated in FIG. 4.

Figure 4:
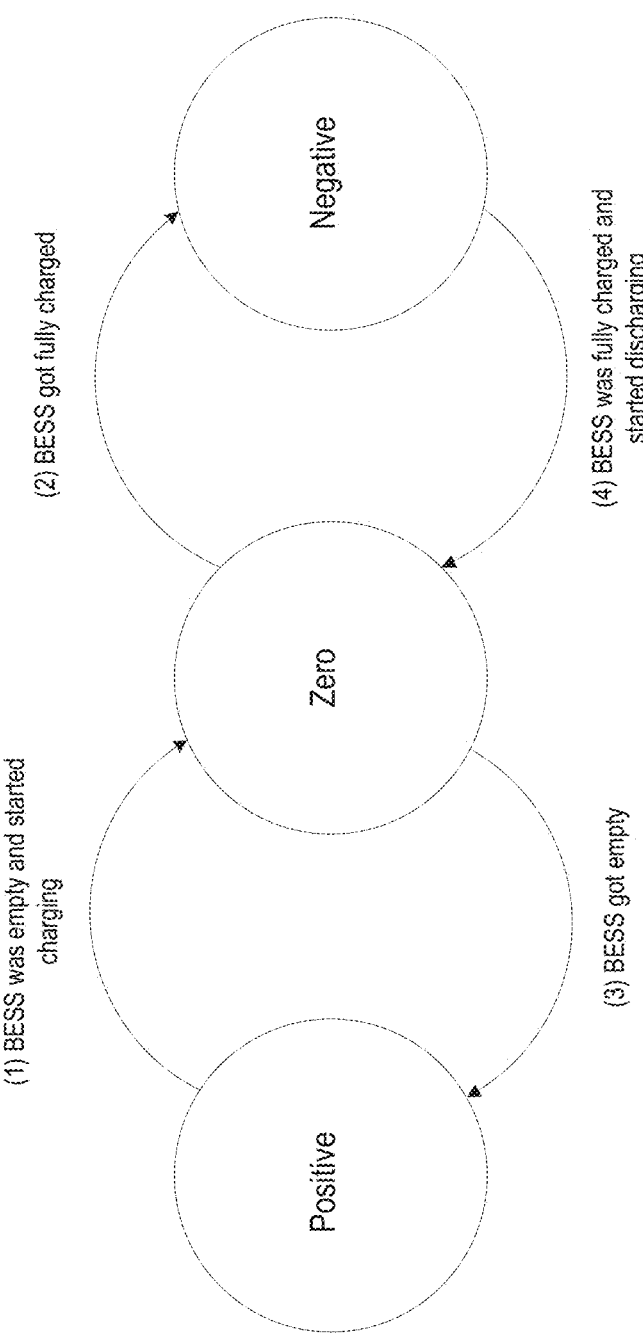
FIG. 4 is a state diagram illustrating state transitions based on sign changes in the measured net power, according to an example embodiment.

Referring to FIG. 4, the circles represent the different states as described above, and the arrows represent conditions that trigger a change of state. In the shown example, the conditions (1), (2), (3) and (4) and the corresponding state changes are as follows:

(1) BESS was empty and started charging: state change from positive to zero. This is based on the assumption that as long as the net power is positive (net power consumption from the grid), the BESS should not be charging and should be empty as it did not discharge itself to supply the net consumption.

(2) BESS got fully charged: state change from zero to negative. This is based on the assumption that the BESS continues to utilize surplus generation until it is completely charged.

(3) BESS got empty: state change from zero to positive. This is based on the assumption that the BESS continues to supply for surplus consumption until it is completely discharged.

(4) BESS was fully charged and started discharging: state change from negative to zero. This is based on the assumption that as long as the net power is negative (net power fed into the grid), the BESS should not be discharging and should remain fully charged.

To estimate a full size of the BESS, the eligible days are determined as days with full usage of the BESS, i.e., days when the BESS gets fully charged and empty on the same day. Thus, the eligible days can be determined by detecting the existence of both of the conditions (2) and (3), i.e., a state change from zero to negative and a state change from zero to positive. The above criteria can thus be used to eliminate days with incomplete deployment of the BESS. The example day shown in FIG. 3 meets this criteria and may hence be considered as an eligible day.

Figure 5:
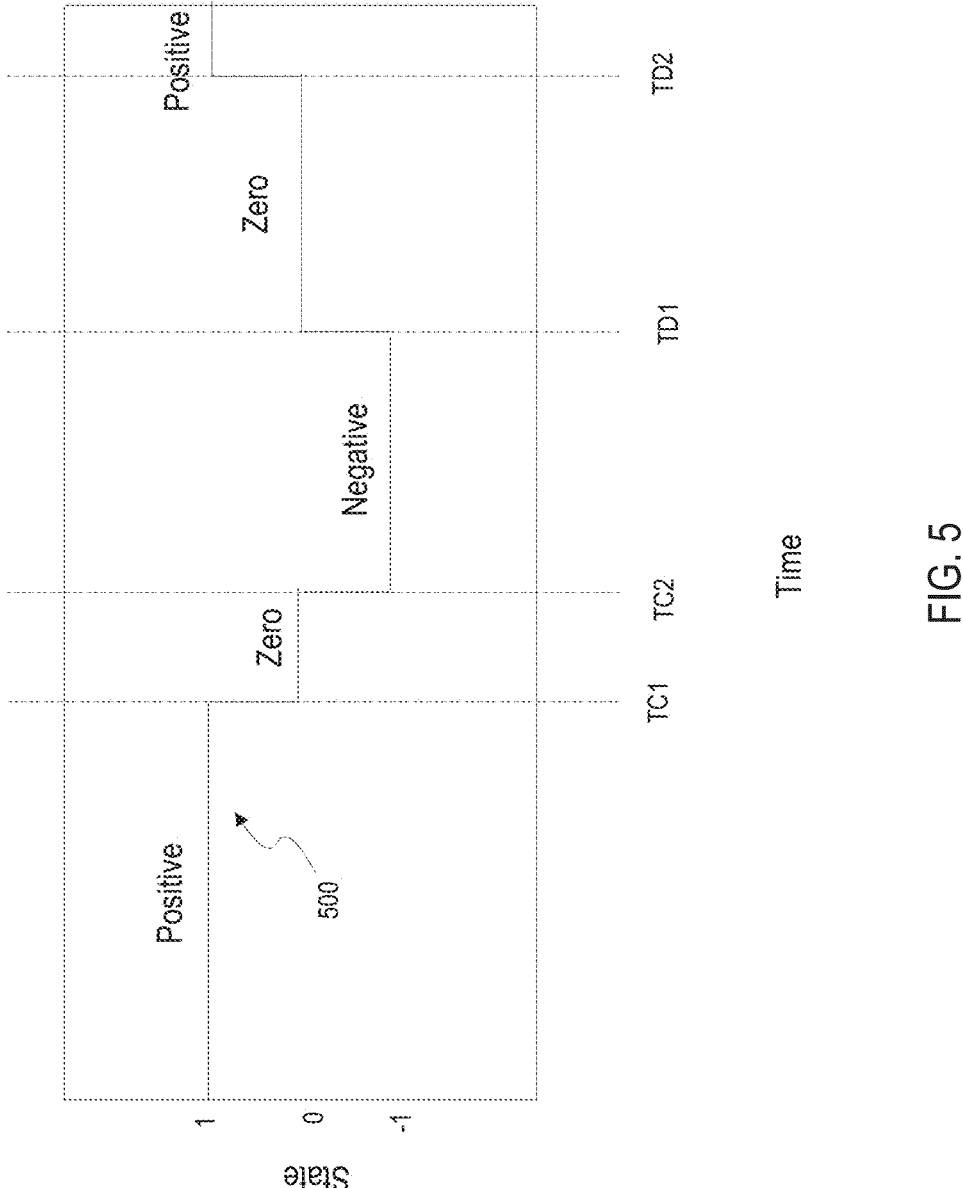
FIG. 5 is a graphical illustration of a time series of states obtained from the measured net power, according to an example embodiment.

In one embodiment, the eligible days may be determined by generating a time series of states based on a sign of the measured net power, for example as illustrated in FIG. 5. In FIG. 5, the plot 500 graphically represents a time series of states, where the states 1 (positive), 0 (zero) and −1 (negative) are derived from a sign of measured net power 300 shown in FIG. 3. Desirably, the time series of states may be smoothed (e.g., using moving averages) to suppress direct state changes from the positive state to the negative state and vice versa. The smoothing thus serves to suppress the effect of significant instantaneous changes in generation or consumption, such that only an overall trend is captured. The days that still include direct state changes between the positive state and the negative state after the smoothing of the time series of states can be excluded from the determination of eligible days.

Turning back to FIG. 2, to implement step S2b, the BESS sessions detection module 204 may determine the start and end times of BESS charge/discharge activity in the one or more eligible days. The start and end times may be determined from the time series of states (e.g., FIG. 5) or directly from the time series of measured net power (e.g., FIG. 3). The start time TC1 of a BESS charge activity may be determined by tracking a state change from the first (positive) state to the third (zero) state. The end time TC2 of a BESS charge activity may be determined by tracking a state change from the third (zero) state to the second (negative) state. The start time TD1 of a BESS discharge activity may be determined by tracking a state change from the second (negative) state to the third (zero) state. The end time TD2 of a BESS discharge activity may be determined by tracking a state change from the third (zero) state to the first (positive) state.

Still referring to FIG. 2, the BESS size evaluation module 206 is configured to evaluate a size of the detected BESS based on the extracted intervals of BESS charge/discharge activity in the one or more eligible days. In a first approach, the BESS size evaluation module 206 may use the extracted intervals of BESS charge/discharge activity to qualitatively analyze how big the BESS is sized in an unsupervised manner (e.g., following steps S3a and S3b). In a second approach, the BESS size evaluation module 206 may exploit the extracted intervals of BESS charge/discharge activity to quantitively estimate the size of the BESS, if estimates for local generation and consumption are available (e.g., following steps S3c and S3d).

The first approach may be implemented based on a comparison of the duration of an extracted interval of BESS charge/discharge activity of the detected BESS to a corresponding interval of charge/discharge activity of another BESS. According to a disclosed embodiment, at step S3a of the first approach, a daily average duration of the charge and/or discharge intervals of the detected BESS may be computed over a number of eligible days. Averaging the daily total duration of charge and/or discharge intervals over multiple eligible days may be done to minimize estimation errors of single days. In an alternate embodiment, the averaging step may be obviated and a daily total duration of the charge and/or discharge intervals for a single eligible day may be computed at step S3a. Next, at step S3b, the size of the detected BESS may be qualitatively predicted, for example, by comparing the duration(s) computed at step S3a to corresponding duration(s) of a charge interval and/or a discharge interval of another BESS with a known or unknown capacity. Practically, this approach may be useful to gain a qualitative insight on whether an investigated BESS has a greater capacity than a BESS of another customer, for example, from the same customer group. For illustration, taking the example of FIG. 1, this approach may be used to compare the size of a first BESS 116b detected at location 110b in relation to a second BESS 116c at location 110c. In addition, the determined durations may be used as a signpost of how well the BESS is sized compared to the generation and consumption, e.g., a very low average charging duration (e.g., less than 2 hours) can be a sign that the BESS is undersized in comparison to the installed PV capacity.

The second approach is based on the availability of estimates of local generation and consumption at the location of the detected BESS. According to a disclosed embodiment, at step S3c of the second approach, a time series of the BESS power may be estimated using the time series data of the measured net power obtained via the meter 120 and available estimates of local generation and consumption. For instance, in case of locations with PV systems, local solar generation estimates can be obtained using a methodology described in the U.S. patent application Ser. No. 18/068,678 filed by the present Applicant, titled "UNSUPERVISED SOLAR ENERGY DISAGGREGATION SYSTEM AND METHOD", the content of which is incorporated by reference herein in its entirety. Power consumption estimates can include, for example, a simplistic typical daily load profile or a stochastic load model of the end-customer. Using the measured net power $P_{net}$ (t) and the estimates for the power consumption $P_c$(t) and the local generation $P_{PV}$(t) (in this case, solar generation), equation (1) can be applied to estimate a time series of the BESS power $P_{BESS}$(t) for the extracted charge/discharge intervals.

Subsequently, at step S3d, the estimated BESS power $P_{BESS}$(t) may be used to quantitively predict a size of the detected BESS in terms of its energy capacity or rated inverter power. The energy capacity of the detected BESS may be estimated by cumulating the estimated BESS power $P_{BESS}$(t) over an extracted interval of BESS charge/discharge activity in one or more eligible days. Desirably, the estimated BESS energy capacity may be averaged over a number of eligible days to minimize estimation errors of single days. The rated inverter power of the detected BESS may be estimated by determining a maximum of the estimated BESS power $P_{BESS}$(t) over all of the extracted intervals of BESS charge/discharge activity in the one or more eligible days.

The disclosed methodology can thus provide a solution to detect the location and size of behind-the-meter BESS for utilities to have deeper visibility on distributed BESS and make strategic decisions on planning flexibility programs for grid-oriented operation of existing BESS and/or new BESS installations in detected regions with low BESS penetration. The disclosed methodology is capable of detecting BESS activities standalone, instead of joint time series disaggregation according to existing solutions that can increase the problem complexity and throw the BESS identification out of focus. However, in some embodiments, the disclosed methodology can be exploited further for quantitative analysis as well if estimates for local generation and consumption are available. Furthermore, disclosed embodiments provide a solution with very high resolution of behind-the-meter BESS identification at end-customer level.

Figure 6:
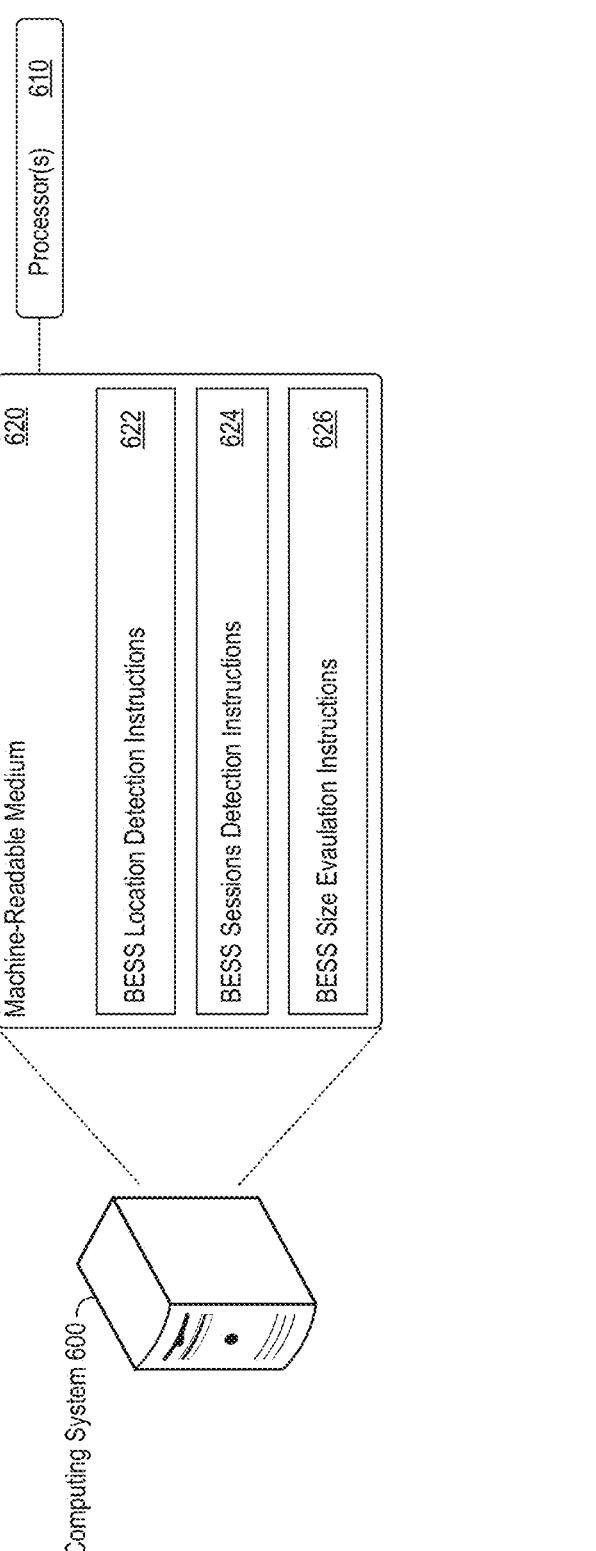
FIG. 6 illustrates a computing system that can support identification of behind-the-meter BESS in a distribution system according to disclosed embodiments.

FIG. 6 shows an example of a computing system 600 that can support identification of behind-the-meter battery energy storage systems in a power distribution system according to disclosed embodiments. The computing system 600 may, for example, be part of a distributed energy resource management system. The computing system 600 includes at least one processor 610, which may take the form of a single or multiple processors. The processor(s) 610 may include a central processing unit (CPU), a graphics processing unit (GPU), a neural processing unit (NPU), a microprocessor, or any hardware device suitable for executing instructions stored on a memory comprising a machine-readable medium. The computing system 600 further includes a machine-readable medium 620. The machine-readable medium 620 may take the form of any non-transitory electronic, magnetic, optical, or other physical storage device that stores executable instructions, such as BESS location detection instructions 622, BESS sessions detection instructions 624 and BESS size evaluation instructions 626, as shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 600 may execute instructions stored on the machine-readable medium 620 through the processor(s) 610. Executing the instructions (e.g., the BESS location detection instructions 622, the BESS sessions detection instructions 624 and the BESS size evaluation instructions 626) may cause the computing system 600 to perform any of the technical features described herein, including according to any of the features of the BESS location detection module 202, the BESS sessions detection module 204 and the BESS size evaluation module 206 described above.

The systems, methods, devices, and logic described above, including the BESS location detection module 202, the BESS sessions detection module 204 and the BESS size evaluation module 206, may be implemented in many different ways in many different combinations of hardware, logic, circuitry, and executable instructions stored on a machine-readable medium. For example, these modules may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the BESS location detection module 202, the BESS sessions detection module 204 and the BESS size evaluation module 206. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and modules described herein, including the BESS location detection module 202, the BESS sessions detection module 204 and the BESS size evaluation module 206, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

Although this disclosure has been described with reference to particular embodiments, it is to be understood that the embodiments and variations shown and described herein are for illustration purposes only. Modifications to the current design may be implemented by those skilled in the art, without departing from the scope of the patent claims.

What is claimed is:

1. A computer-implemented method for identifying behind-the-meter battery energy storage systems in a distribution system comprising distributed generators installed at a number of locations in the distribution system, the method comprising:

obtaining time series data of measured net power over a number of days via a respective meter at each location, for each meter, processing the time series data to detect a behind-the-meter battery energy storage system (BESS) at the corresponding location based on detection of flat intervals in which the measured net power is constant within a defined tolerance band for a minimum continuous period, the flat intervals indicative of BESS charge/discharge activity, if a BESS is detected, then using the time series data of the measured net power to detect a first state defined by intervals of net power consumption from a grid, a second state defined by intervals of net power fed into the grid, and a third state defined by flat intervals corresponding to BESS charge/discharge activity, and therefrom determining one or more eligible days that include a state change from the third state to the first state and a state change from the third state to the second state, and extracting intervals of BESS charge/discharge activity in the one or more eligible days to evaluate a size of the detected BESS.

2. The method according to claim 1, wherein detecting a behind-the-meter BESS comprises determining if a daily total duration of the flat intervals, or an average daily total duration of the flat intervals over the number of days, is above a threshold.

3. The method according to claim 1, wherein the flat intervals are "zero intervals" when the measured net power is zero within a tolerance band defined as a specified percentage of a maximum measured net power in the time series data.

4. The method according to 3, wherein the one or more eligible days are determined by:

generating a time series of states based on a sign of the measured net power, and smoothing the time series of states to suppress direct state changes from the first state to the second state and vice versa.

5. The method according to claim 1, wherein extracting the intervals of BESS charge/discharge activity in the one or more eligible days comprises:

tracking a state change from the first state to the third state to determine a start time of a BESS charge activity and tracking a state change from the third state to the second state to determine an end time of the BESS charge activity, and tracking a state change from the second state to the third state to determine a start of a BESS discharge activity and tracking a state change from the third state to the first state to determine an end time of the BESS discharge activity.

6. The method according to claim 1, wherein evaluating the size of the detected BESS comprises comparing a duration of an extracted interval of BESS charge/discharge activity of the detected BESS to a corresponding interval of charge/discharge activity of another BESS.

7. The method according to claim 1, wherein evaluating the size of the detected BESS comprises:

using the time series data of the measured net power $P_{net}(t)$ and estimates of a power consumption $P_c(t)$ and a local generation $P_{PV}(t)$ at the location to estimate a BESS power $P_{BESS}(t)$ using the relationship $P_{net}(t)=P_c(t)-P_{PV}(t)\pm P_{BESS}(t)$, and estimating an energy capacity of the detected BESS by cumulating the estimated BESS power $P_{BESS}(t)$ over an extracted interval of BESS charge/discharge activity in the one or more eligible days.

8. The method according to claim 1, wherein evaluating the size of the detected BESS comprises:

using the time series data of the measured net power $P_{net}(t)$ and estimates of a power consumption $P_c(t)$ and a local generation $P_{PV}(t)$ at the location to estimate a BESS power $P_{BESS}(t)$ using the relationship $P_{net}(t)=P_c(t)-P_{PV}(t)\pm P_{BESS}(t)$, and estimating a rated inverter power of the detected BESS by determining a maximum of the estimated BESS power $P_{BESS}(t)$ over all of the extracted intervals of BESS charge/discharge activity in the one or more eligible days.

9. The method according to claim 1, wherein the distributed generators comprise solar generators.

10. The method according to claim 1, wherein the number of locations include residential sites, commercial sites, industrial sites, or combinations thereof.

11. A non-transitory computer-readable storage medium including instructions that, when processed by a computing system, configure the computing system to perform the method according to claim 1.

12. A system for identifying behind-the-meter battery energy storage systems in a distribution system comprising distributed generators installed at a number of locations in the distribution system, the system comprising:

one or more processors, and a non-transitory memory in communication with the one or more processors, the non-transitory memory including algorithmic modules executable by the one or more processors, the algorithmic modules comprising:

a BESS location detection module configured to:

obtain time series data of measured net power over a number of days via a respective meter at each location, and for each meter, process the time series data to detect a behind-the-meter battery energy storage system (BESS) at the corresponding location based on detection of flat intervals in which the measured net power is constant within a defined tolerance band for a minimum continuous period, the flat intervals indicative of BESS charge/discharge activity, a BESS sessions detection module executable if a BESS is detected, the BESS sessions detection module configured to use the time series data of the measured net power to detect a first state defined by intervals of net power consumption from a grid, a second state defined by intervals of net power fed into the grid, and a third state defined by flat intervals corresponding to BESS charge/discharge activity, and therefrom determining one or more eligible days that include a state change from the third state to the first state and a state change from the third state to the second state, and a BESS size evaluation module configured to evaluate a size of the detected BESS based on extracted intervals of BESS charge/discharge activity in the one or more eligible days.

\* \* \* \* \*